Nov. 29, 1949 N. BULLIAN 2,489,857
VOICE REPRODUCING INSTRUMENT
Filed Oct. 20, 1945
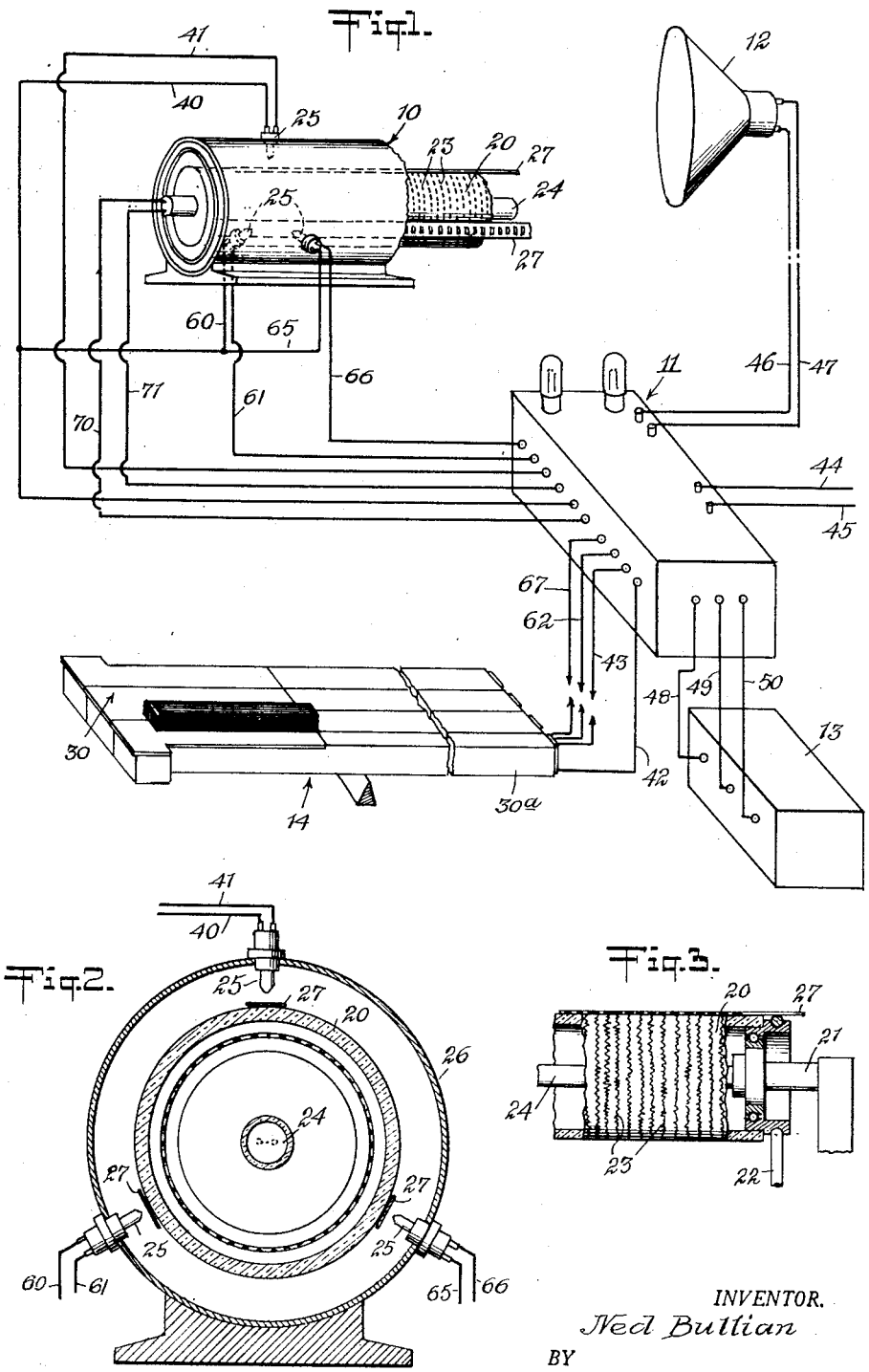
INVENTOR.
Ned Bullian
BY
Munn, Liddy & Glaccum
Attorneys Patented Nov. 29, 1949

2,489,857

UNITED STATES PATENT OFFICE 2,489,857

VOICE REPRODUCING INSTRUMENT

Ned Bullian, New York, N. Y.

Application October 20, 1945, Serial No. 623,589

1 Claim. (Cl. 84—1.18)

This invention relates to voice reproducing instruments.

The principal object of the invention is the provision of apparatus for reproducing sound and more particularly for reproducing the singing voices of famous artists. Each artist would sing the chromatic scale and each note of said scale thus sung would be recorded for reproduction in the apparatus herein described and claimed. In accordance with the present invention, it would be possible for the person operating the apparatus described to reproduce the sounds of said notes in any sequence, irrespective of the sequence in which they were originally sung. It would thus be possible for the player using this apparatus to render a song sung by the artist in question although all the artist ever did in connection with this apparatus was to sing the chromatic scale.

Another object of this invention is the provision of apparatus of the character described which may incorporate the chromatic scale sung by several artists—one, for example, a soprano and another a tenor—and it would be possible using this apparatus to render a duet sung by both artists.

A further object of the invention is the provision of apparatus of the character described in which the notes of the chromatic scale would be played by a well known orchestra and it would thereby be possible for the player to render an orchestral work upon the basis of selecting these notes in accordance with said work.

A preferred embodiment of this invention is shown in the accompanying drawing in which—

Fig. 1 is a diagrammatic view of the electric circuit of this invention showing fragmentary perspective views of the key board and the cylindrical record which constitutes part of the apparatus of said invention;

Fig. 2 is a vertical section through said cylindrical record and the sound reproducing apparatus with which it is used; and Fig. 3 is a fragmentary vertical section on a plane perpendicular to the plane of the section in Fig. 2, showing said cylindrical record and the mounting thereof.

The apparatus herein claimed comprises the following units: An electrical "pick-up" unit 10, a sound amplifying unit 11 such as is shown and referred to, although not described, in Patent No. 1,998,461 issued to A. A. Kucher on April 23, 1935, (see amplifying unit 137 in Fig. 13); including a loud speaker 12 and a conventional volume control unit 13 and the key board 14 which controls the sound reproducing unit 10.

The sound reproducing unit 10 comprises a transparent cylindrical record 20 rotatably mounted on a support 21 and connected by means of a drive belt 22 to an electric motor (not shown). Each wavy line 23 on cylindrical record 20 represents a note forming a component part of the chromatic scale as sung by a well known artist or as played by a well known orchestra. Within said cylindrical record is a source of light 24, preferably a neon tube. A plurality of photo-electric cells 25—one cell for each sound track 23—are mounted radially of the neon tube 24 and exteriorly of the cylindrical record 20 on a bracket supporting member 26. An apertured shield 27 is slidably disposed between each of the photo-electric cells 25 and the cylindrical record 20. The apertures in said shield are spaced to correspond to the spacing of the sound tracks 23 in said cylindrical record. A manually operated control (not shown) moves any one of the shields 27 longitudinally to bring the apertures in said shield into registration with the photo-electric cells 25 or to take them out of registration therewith.

Each one of the keys 30 in the key board 14 controls a circuit to one of the photo-electric cells 25. The keys are set up in the same order as the keys on a standard piano or piano accordion and the sound tracks which lie opposite the photo-electric cells 25 controlled by said keys correspond in order to the order of the strings of a standard piano or the reeds of a standard piano accordion.

The electric circuit between a typical key 30a and the three photo-electric cells 25 which it controls is as follows: Referring now to the photo-electric cells which is situated at the top of the cylindrical record 20 in Fig. 1, the circuit includes a ground wire 40 and a second wire 41 which connects said photo-electric cell to the amplifier 11. The key 30a is grounded by means of conductor 42. Wire 43 completes the circuit which includes wires 40 to 43, inclusive, and the amplifier 11. Conductors 44 and 45 connect the amplifier to a source of electric current (not shown), conductors 46 and 47 connect said amplifier to the loud speaker 12 and conductors 48, 49 and 50 connect said amplifier to the sound control box 13. The amplifier 11, loud speaker 12 and sound control box 13 constitute conventional equipment and the electrical connections between them are also conventional. The photo-electric cell which is situated in the lower left hand corner in Fig. 1 is connected to the ground by means of conductor 60. Conductor 61 connects said photo-electric cell to the amplifier 11 and conductor 62 continues the circuit and connects said amplifier to the key 30a. Again a circuit is made which includes the conductors 60, 40, 62 and 42 and the amplifier 11. The third photo-electric cell in Fig. 1 is connected to the ground by means of conductor 65. It is also connected to the amplifier 11 by means of the conductor 66 and the circuit continues with conductor 67 connecting said amplifier to the key 30a. Thus, a third circuit is completed which includes conductors 65, 40, 42, 67 and 66 and the amplifier 11. It will be understood that the keys 30 constitute switch control members which close all of the circuits to which the keys are connected. Thus the key 30a hereinabove under discussion, when depressed, closes the circuits to the three photo-electric cells shown in Fig. 1. Conductors 70 and 71 connect the neon tube 24 to the amplifier 11 and the source of electrical current.

The apparatus operates as follows: If it be desired to render a song as sung by a single artist, the shield 27 which lies opposite the bank of photo-electric cells which are situated opposite the sound tracks of said artist's voice is moved to bring the apertures therein into registration with said photo-electric cells and with said sound tracks. The other shields are left where they are, namely, in position of non-registration between their respective apertures and the photo-electric cells and sound tracks which they control. The keys 30 are then depressed in the required order to render the song. When key 30a, for example, is depressed all three circuits to the three photo-electric cells shown in Fig. 1 are closed but only one of said photo-electric cells will be activated by the light which passes through the cylindrical record from the neon tube, since the other two photo-electric cells are shielded from exposure to the light rays from said neon tube by the shields 27 which lie opposite them. Should it be desired to render a duet, a second of the three shields 27 is moved manually to a position of registration between the apertures contained therein and the sound tracks carrying the second voice. If an orchestral accompaniment be desired and the third set of sound tracks embody the chromatic scale as played by a well known orchestra, then the third shield 27 is moved to a position of registration between the apertures therein and said third set of sound tracks. At this point, the light rays from the neon tube 24 will pass through the cylindrical record 20 and strike all of the photo-electric cells situated around it. The striking of any one of the keys 30, therefore, will have the effect of activating three photo-electric cells simultaneously. The presence of the sound tracks 23 in the path of the rays from the neon tube 24 to the photo-electric cells 25 has the effect, of course, of causing a reproduction of the sound which said sound tracks represent, the reproduced sound ultimately emanating in the usual manner from the speaker 12.

A preferred form only of this invention has hereinabove been described. It will be understood that modifications and variations may be incorporated therein without departing from the basic principles of the invention. For example, the apparatus herein described may be used alone or it may be used in connection with a standard piano or organ or accordion. In the case of the accordion, for example, the apparatus would be controlled by remote control, the key board being on the accordion and the rest of the apparatus being in another location. Any number of octaves may be incorporated into the sound tracks of the cylindrical record and any number of banks of photo-electric cells. Thus by way of illustration, a full score of banks of cells, each representing a different voice or instrument, may be employed and the full effect of actuating all of these banks simultaneously would be the rendition of choral singing or of orchestral or band playing. Instead of a neon tube, a single filament bulb may be used.

I claim:

A musical instrument which includes a fixed support, a stationary cylindrical casing on said support, a rotatable transparent cylinder disposed concentrically within said casing and adapted to be rotated therewithin, a plurality of separate, independent, endless, sound tracks disposed side by side on said cylinder, a photo-electric cell mounted on said casing and disposed toward the surface of said cylinder, and a manipulable, perforated shield disposed between the cell and the rotatable cylinder and adjustable to control the pasage of light to said cell from said sound tracks.

NED BULLIAN.

REFERENCES CITED

The following references are of record in the file of this patent:

UNITED STATES PATENTS

| Number | Name | Date |
| --- | --- | --- |
| 2,142,391 | Fuschi | Jan. 3, 1939 |
| 2,215,056 | Ropohl | Sept. 17, 1940 |
| 2,410,956 | Benjamin | Nov. 12, 1946 |